(12) United States Patent
Runion

(10) Patent No.: US 6,381,097 B1
(45) Date of Patent: Apr. 30, 2002

(54) POCKET RECORDER

(76) Inventor: William J. Runion, 202 Crews St., Winston Salem, NC (US) 27101

( * ) Notice: Subject to any disclaimer, the term of this patent is extended or adjusted under 35 U.S.C. 154(b) by 0 days.

(21) Appl. No.: 09/550,239

(22) Filed: Apr. 14, 2000

(51) Int. Cl.⁷ .............................................. G11B 33/12
(52) U.S. Cl. ....................................................... 360/137
(58) Field of Search ......................... 360/137, 85, 132, 360/133

(56) References Cited

U.S. PATENT DOCUMENTS

| | | | |
|---|---|---|---|
| 3,583,657 A | 6/1971 | Boyce | |
| 4,293,742 A | * 10/1981 | Sato et al. | 360/137 |
| 4,944,401 A | 7/1990 | Groenewegen | 206/521 |
| 5,208,717 A | * 5/1993 | Takao | 360/137 |
| 5,210,736 A | * 5/1993 | Hayama et al. | 360/137 |
| 5,303,109 A | * 4/1994 | Takao | 360/137 |
| 5,341,254 A | * 8/1994 | Ueno | 360/137 |
| 5,349,480 A | * 9/1994 | Takao | 360/137 |
| 5,383,079 A | * 1/1995 | Takao | 360/137 |
| 5,495,992 A | * 3/1996 | Nielsen | 360/132 |
| 5,577,681 A | * 11/1996 | Sano et al. | 360/132 |
| 6,009,356 A | 12/1999 | Monroe | 701/14 |

* cited by examiner

Primary Examiner—Allen Cao

(57) ABSTRACT

A pocket recorder is provided for use by aircraft passengers and others that might encounter a tragic experience. The recorder is operated mechanically with a spring drive and includes an audio recording tape. A floatation balloon is contained with the recorder for ejection at a selected depth below the surface of water such as an ocean to provide buoyancy to the recorder to provide an aid in the recovery process.

12 Claims, 2 Drawing Sheets

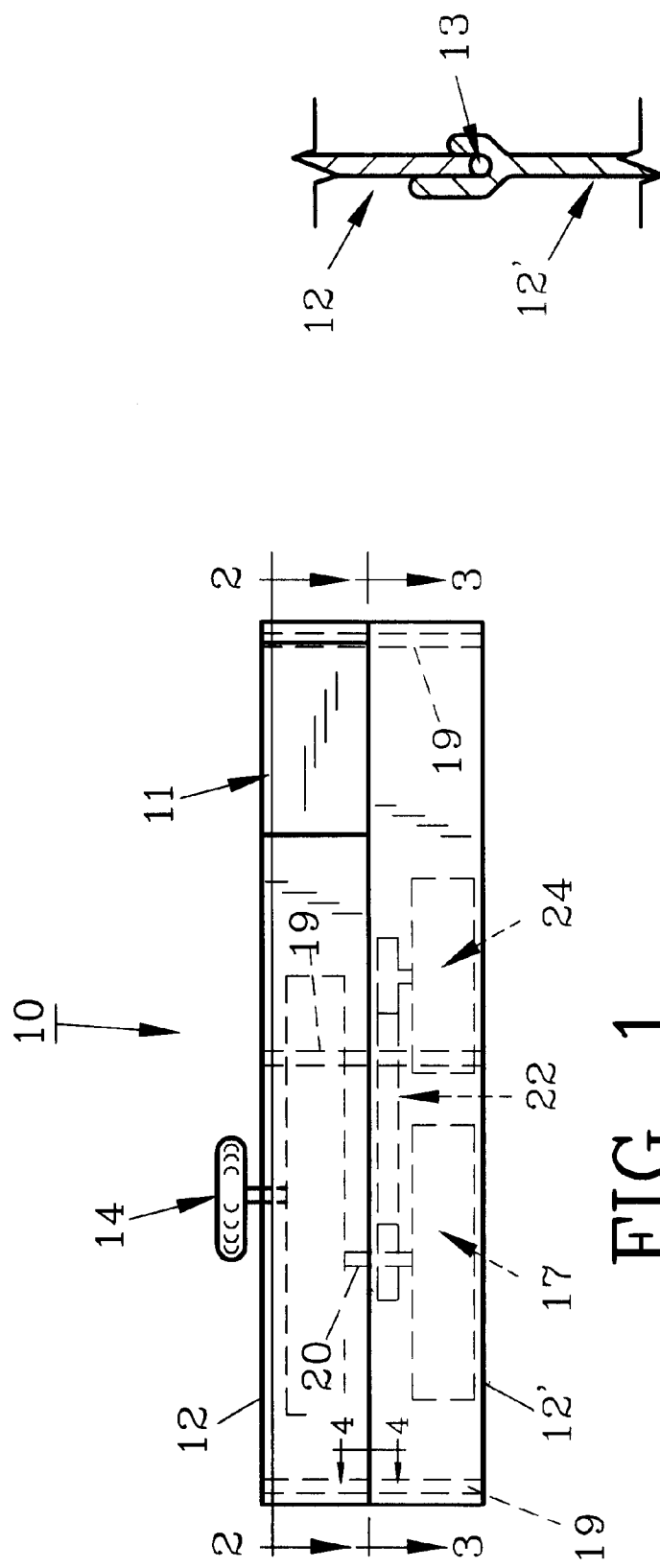

POCKET RECORDER

FIELD OF THE INVENTION

The invention herein pertains to a audio recording device which can be easily carried in a shirt or jacket pocket and particularly pertains to a recording device which can be used by individuals during aircraft accidents.

DESCRIPTION OF THE PRIOR ART AND OBJECTIVES OF THE INVENTION

Commercial aircrafts have long employed inflight recording devices or "black boxes" to record conversations of pilots and aircraft personnel during the last moments of a flight while efforts are being made to prevent or minimize aircraft crashes. These recorders are generally housed within the fuselage of the aircraft and are often covered at great ocean depths. Such recordings are valuable in providing investigators with observations, conditions and causes of aircraft accidents. U.S. Pat. No. 3,583,657 demonstrates a type of recorder which is buoyant in the event of an ocean crash. U.S. Pat. Nos. 4,944,401 and 6,009,356 likewise demonstrate other conventional aircraft recording devices.

In addition to the devastation of property which occurs as a result of a commercial aircraft tragedy, human lives are also destroyed and such tragedies extend far beyond the lives of the slain passengers. Family members are left with much grief and sorrow as a result of such accidents.

Thus, in view of the foregoing experiences, the present invention was conceived and one of its objectives is to provide a recorder which can be carried on the person such as in the breast pocket of a shirt or jacket which will record a last message during a tragic situation such as during the final stages of an airplane accident.

It is yet another objective of the present invention to provide a durable pocket recorder and method for mechanically recording a conversation or message as desired.

It is a further objective of the present invention to provide a pocket recorder with a microphone which will run for extended periods of time such as several hours during an aircraft flight.

It is a further objective of the present invention to provide a pocket recorder which will become buoyant and float to the surface should it reach a selected depth under water.

It is still another objective of the present invention to provide pocket recorder having a pressure switch and balloon which will inflate and eject from the recorder causing the recorder to become buoyant.

Various other objectives and advantages of the present invention will become apparent to those skilled in the art as a more detailed description is set forth below.

SUMMARY OF THE INVENTION

The aforesaid and other objectives are realized by providing a pocket recorder for individuals such as aircraft passengers to carry on their person. The pocket recorder is operated by a spring drive mechanism which will turn a dual reel audio tape for an extended period of time such as six to eight hours for use such as during a lengthy aircraft flight. A coil spring is manually wound which will power the tape drive and a battery operated microphone will deliver audio signals to the recording head. Thus, during flight the recorder is activated and a microphone is exposed for receiving voice or other audio sounds. If the flight is without instance, the audio tape can be rewound for use on future flights. However, in the event of an aircraft accident or other dangerous situation, the recorder will provide a history of voice messages and other sounds. Should the aircraft crash into the ocean a floatation balloon is provided which will eject through a thin aluminum wall and cause the recorder to remain in a buoyant state on the water's surface. The balloon is operated by a pressure sensitive switch and is filled by a pressure tank contained within the recorder. Rescue personnel upon seeing the inflated balloon can easily lift it aboard a rescue ship or otherwise. The recorder can then be opened, the tape transferred to a conventional tape player so the recorded events can be heard and understood. In addition, the family of the passenger can hear the passenger's departing words and sentiments.

BRIEF DESCRIPTION OF THE DRAWINGS

FIG. 1 shows a side elevational view of the pocket recorder in a closed fashion;

FIG. 4 shows a cross-sectional view of the side walls of the pocket recorder as shown in FIG. 1 along lines 4—4.

DETAILED DESCRIPTION OF THE PREFERRED EMBODIMENT AND OPERATION OF THE INVENTION

Figure 3:
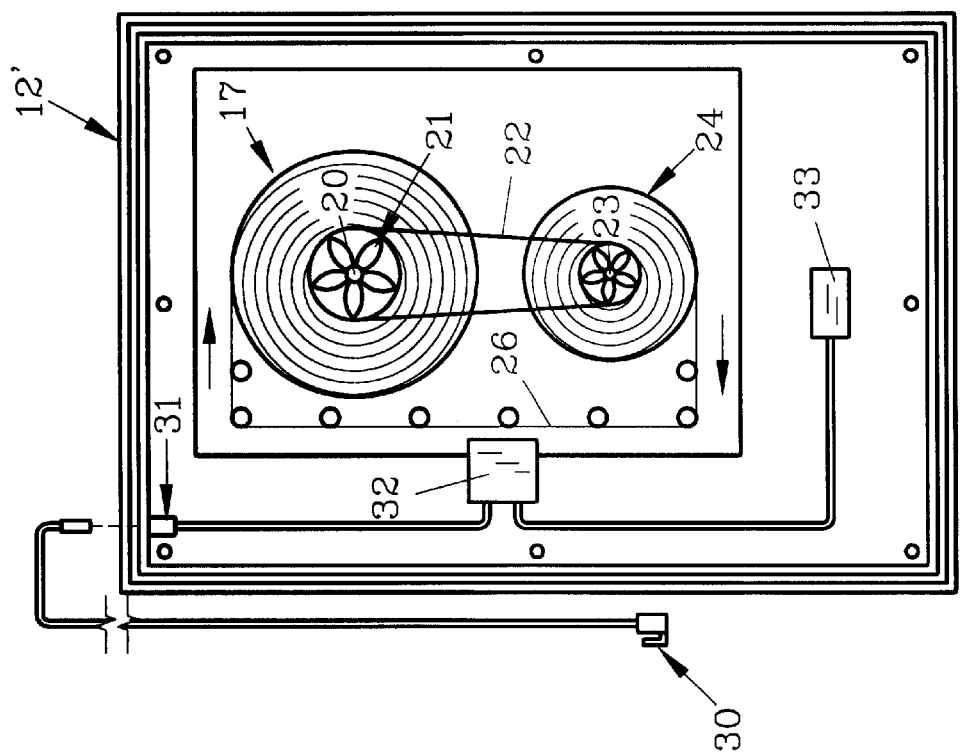
FIG. 3 shows a top view of the bottom section of the recorder shown in FIG. 1 along lines 3—3.
Figure 2:
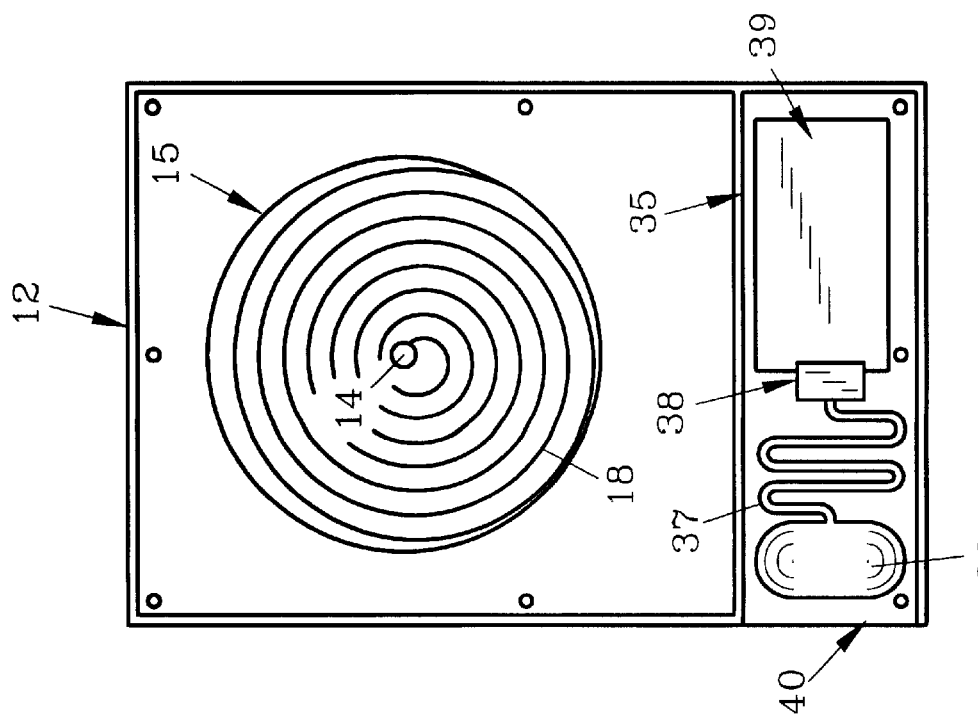
FIG. 2 shows a view of the upper section of the pocket recorder along lines 2—2 as shown in FIG. 1.

For a better understanding of the invention and its operation, turning now to the drawings, FIG. 1 shows a side elevational view of preferred pocket recorder 10 having a housing 11 comprising upper section 12 and lower section 12'. Sections 12 and 12' each have a rectangular shape and are formed from titanium metal with the outer walls, when closed sealed with gasket 13 as shown generally in FIG. 4. Lower section 12' has an outer wall having a somewhat "Y" configuration for containing gasket 13. Upper section 12 and lower section 12' are held together by bolts 19 as seen in FIG. 1. Upper section 12 as seen in FIG. 2 contains spring drive 15 which acts to drive tape reel 17 (FIG. 3). Spring drive 15 as shown in FIG. 2 includes manual winding stem 14 (FIG. 1) and conventional coiled metal spring member 18 as is standard in spring operated devices. An on/off switch (not seen) allows the operator to manually release (start) or stop spring drive 15. Spring drive 15 is connected by shaft 20 (FIG. 3) to tape reel 17 in lower section 12'. As seen in FIG. 3, tape reel 17 comprises gear 21 which rotates belt 22 thereby turning gear 23 on reel 24. Thus, as explained, reels 17 and 24 are operated by spring drive 15 and record audio sounds received from microphone 30 which may be positioned on the outside of a shirt breast pocket or the like. Microphone 30 is connected to lower section 12' through jack 31. Recording head 32 provides input for audio tape 26. As hereinbefore described, audio tape 26 is of a length sufficient for six to eight hours of continuous recording as may occur during a long aircraft flight. Likewise, spring drive 15 is sized to power tape reels 17 and 24 for such extended periods of time.

As further shown in FIG. 2, upper section 12 of pocket recorder 10 includes balloon compartment 35 containing inflatable balloon 36 joined to tubular member 37 which is affixed to pressure sensor 38. Pressure sensor 38 is positioned to activate tank 39 which acts as a means to inflate balloon 36 and may be filled with a compressed gas, a conventional explosive charge or otherwise to direct gases through tube 37 to inflate balloon 36. Sensor 38 is devised to activate tank 39 to inflate balloon 36 at a preselected depth such as twenty to forty feet beneath the top surface of an ocean or other body of water. As balloon 36 begins inflation, thin aluminum rupturable wall 40 as seen in FIG. 2 will break away by pressure applied by inflating balloon 36, allowing balloon 36 to escape upper section 12 of housing 11 while remaining connected to tubular member 37 and tank 39. Thus, once inflated balloon 36 escapes housing 11, pocket recorder 10 will thereby be lifted near the water's surface. Balloon 36 made from a rigid polymeric material can be easily seen due to its light color and can be captured by rescue personnel. Once pocket recorder 10 has been retrieved, tape reels 17 and 24 can be rewound or transferred to another device for playing as no playback provisions are within recorder 10.

The preferred method of use includes the step of manually winding pocket recorder 10 and placing it in the pocket of the user with the microphone exposed. Pocket recorder 10 is then activated and voices, messages or other sounds are recorded. In the event of a tragedy, the pocket recorder is retrieved, audio tape 26 is removed from recorder 10 and transferred to a conventional playback device, such as a standard tape recorder. Audio tape 26 is then rewound and the audio tape is activated so that the messages or other sounds contained thereon are played for listening purposes.

The illustrations and examples provided herein are for explanatory purposes and are not intended to limit the scope of the appended claims.

I claim:

1. A pocket recorder comprising: a housing, a recording tape, a tape reel, said recording tape wound on said tape reel, a spring drive, said spring drive connected to said tape reel, a balloon compartment, said recording tape, tape reel, said spring drive and said balloon compartment contained within said housing, a microphone, said microphone communicating with said tape whereby sounds received by said microphone are recorded on said tape as said tape is turned by said spring drive.

2. The pocket recorder of claim 1 further comprising a microphone jack, said microphone jack attached to said housing.

3. The pocket recorder of claim 1 further comprising a means to inflate said balloon, said inflation means contained within said housing.

4. The pocket recorder of claim 3 further comprising a tube, said tube connected to said balloon and to said inflation means.

5. The pocket recorder of claim 1 wherein said housing comprises an upper section.

6. The pocket recorder of claim 1 further comprising a winding stem, said winding stem joined to said spring drive, said winding stem positioned exteriorly of said housing for winding said spring drive.

7. The pocket recorder of claim 1 wherein said spring driver comprises a coiled spring.

8. The pocket recorder of claim 1 wherein said housing is formed from titanium.

9. The pocket recorder of claim 1 wherein said housing comprises a rupturable wall, said rupturable wall rupturable by inflation of said balloon.

10. The pocket recorder of claim 3 further comprising a pressure switch, said pressure switch positioned within said housing for activating said inflation means.

11. A pocket recorder comprising: a housing, a recording tape, a pair of tape reels, said tape wound on said tape reels, a spring drive, said spring drive connected to said tape reels to drive the same, a microphone, said microphone communicating with said recording tape for recording sounds thereon, said recording tape, tape reels and said spring drive contained within said housing, a microphone jack, said microphone jack attached to said housing for connection to said microphone, an inflatable balloon, said balloon contained within said housing, a pressure switch, said pressure switch contained within said housing whereby sufficient pressure applied to said housing will release said balloon therefrom.

12. The pocket recorder of claim 11 wherein said spring drives comprise a mechanical spring.

\* \* \* \* \*